United States Patent [19]

Hergenrother et al.

[11] Patent Number: 5,276,099

[45] Date of Patent: Jan. 4, 1994

[54] (VINYL SULFOXIDE)-CAPPED ELASTOMERS AND COMPOSITIONS CONTAINING THEM HAVING REDUCED HYSTERESIS PROPERTIES

[75] Inventors: William L. Hergenrother, Akron; John M. Doshak, Mogadore, both of Ohio

[73] Assignee: Bridgestone Corporation, Tokyo, Japan

[21] Appl. No.: 815,736

[22] Filed: Dec. 30, 1991

[51] Int. Cl.$^5$ .......................................... C08F 273/00
[52] U.S. Cl. ..................................... 525/291; 525/343
[58] Field of Search ........................................ 525/291

[56] References Cited

U.S. PATENT DOCUMENTS

| | | | |
|---|---|---|---|
| 3,177,190 | 4/1965 | Hsieh | 525/340 |
| 3,426,006 | 2/1969 | Nutzel et al. | |
| 4,015,061 | 3/1977 | Schulz et al. | 526/178 |
| 4,026,865 | 5/1977 | Uraneck et al. | |
| 4,414,372 | 11/1983 | Farnham et al. | 526/190 |
| 4,429,091 | 1/1984 | Hall | 526/181 |
| 4,614,771 | 9/1986 | Watanabe et al. | 525/351 |
| 4,616,069 | 10/1986 | Watanabe et al. | 525/370 |
| 4,736,003 | 4/1988 | Schneider et al. | 526/190 |

FOREIGN PATENT DOCUMENTS

| | | |
|---|---|---|
| 0282437 | 9/1988 | European Pat. Off. |
| 0290883 | 11/1988 | European Pat. Off. |
| 0316255 | 5/1989 | European Pat. Off. |
| 247455 | 7/1987 | German Democratic Rep. |
| 2117778 | 8/1985 | United Kingdom |

OTHER PUBLICATIONS

"Anionic Polymerization Initiators Containing Protected Functional Groups and Functionally Terminated Diene Polymers", Journal of Polymer Science Polymer Chemistry Edition, vol. 12, pp. 153-166 by Schultz et al.
"Specific Functionalization of Polymers by Carboxyl Groups", Makromal Chem. 179, 1978, pp. 1383-1386 by Broze et al.
"3-Dimethylaminopropyl-Lithium—An Analytical and Kinetic Investigation of a New Initiator System for Polymer Synthesis", European Polymer Journal vol. 11, 1975, pp. 699-704 by Eisenback et al.

Primary Examiner—Christopher Henderson
Attorney, Agent, or Firm—Daniel N. Hall

[57] ABSTRACT

Poly (vinyl sulfoxide)- and (vinyl sulfoxide)-capped elastomers made by capping a lithium terminated elastomer (such as a lithium terminated styrene-butadiene rubber) with more than 0.5 equivalent of vinyl sulfoxide monomer provide compounded elastomer vulcanizates of lowered hysteresis characteristics. Such low hysteresis vulcanizates are useful in making road-contacting tread components of pneumatic tires. Tires with such tread components exhibit low rolling resistance and reduced heat build-up during use.

4 Claims, No Drawings

(VINYL SULFOXIDE)-CAPPED ELASTOMERS AND COMPOSITIONS CONTAINING THEM HAVING REDUCED HYSTERESIS PROPERTIES

TECHNICAL FIELD

The subject invention relates to elastomers, vulcanizable compositions made from them and manufactured components made from these compositions. More specifically, the present invention relates to elastomers capped with (vinyl sulfoxide) blocks, compounded compositions containing such capped elastomers and reinforcing agents and compositions such as treads for tires made from such compositions.

Vulcanizates made from the (vinyl sulfoxide) - capped elastomers of the present invention have low hysteresis characteristics. Because of these reduced hysteresis properties, articles such as tires, power belts, vibration isolators and the like fabricated from components containing these vulcanizates exhibit increased rebound, decreased rolling resistance and lowered heat build-up when subjected to mechanical stresses.

BACKGROUND

It is known that it is desirable to produce elastomeric polymers capable of exhibiting reduced hysteresis when properly compounded with other ingredients such as reinforcing agents and then vulcanized. Such elastomers, when fabricated into components for constructing articles such as tires, vibration isolators, power belts, and the like, will manifest properties of increased rebound, decreased rolling resistance and less heat-build up when subjected to mechanical stress during normal use.

The hysteresis of an elastomer refers to the difference between the energy applied to deform an article made from the elastomer and the energy released as the elastomer returns to its initial, undeformed state. In pneumatic tires, lowered hysteresis properties are associated with reduced rolling resistance and heat build-up during operation of the tire. These properties, in turn, result in lowered fuel consumption of vehicles using such tires and prolonged tire life. In such contexts, the property of lowered hysteresis of compounded, vulcanizable elastomer compositions is particularly significant. Examples of such compounded elastomer systems are known to the art and are comprised of at least one elastomer (that is, a natural or synthetic polymer exhibiting elastomer properties, such as a rubber), a reinforcing filler agent (such as finely divided carbon black, thermal black, or mineral fillers such as clay and the like) and a vulcanizing system such as sulfur-containing vulcanizing (that is, curing) system.

Various synthetic strategies have been developed to provide elastomers with molecular structures exhibiting reduced hysteresis energy losses. One technique is to produce elastomers of very high molecular weight. In such high molecular weight systems, the number of free, uncrosslinked molecular chain-ends per given weight in the vulcanizates made from them are reduced. Since the presence of free, unbound chain ends are believed to be a significant factor in hysteretic energy loss because they cannot participate in elastic recovery processes, their reduction leads to a desirable reduction in hysteretic energy loss.

Another technique is to prepare elastomer molecules with end groups capable of interacting with the reinforcing fillers such as carbon black present in compounded elastomer compositions. Again, such interaction reduces the number of free end groups believed to contribute to hysteretic losses. Such interactive end groups include those derived from tin or other metal reagents as well as those derived from polar organic reagents such amines, amides, esters, imines, imides, ketones and various combinations of such groups. For example, commonly assigned U.S. Pat. application Ser. No. 07/703,533 now U.S. Pat. No. 5,151,469 describes elastomers with end-groups derived by reacting an anionically prepared polymer having a reactive lithium site with about an equivalent of an alkyl or aryl sulfoxide compound to provide an elastomer with polar end groups. This application does not disclose or suggest reaction of polymer with a vinyl sulfoxide which, under the anionic conditions used in this invention, occurs through the vinyl functionality. Thus, the capping reactions occuring in the present invention are inherently different than those occuring with alkyl or aryl sulfoxides.

The present invention is directed to vinyl sulfoxide-capped elastomers which, when used to prepare a compounded and vulcanized by known rubber processing techniques, provide vulcanized elastomers which exhibit desirable low hysteresis characteristics. These (vinyl sulfoxide)-capped elastomers can be made by reacting lithium - terminated elastomer intermediates with more than one equivalent of at least one vinyl sulfoxide. The (vinyl sulfoxide)-capped elastomers thereby produced contain short blocks of poly (vinyl sulfoxide) having a degree of polymerization of about 1 or more. Mixtures of (vinyl sulfoxide)-capped elastomers with the uncapped elastomer derived from the lithium terminated elastomer are also useful. For convenience, these mixtures can be described as having a degree of polymerization less than 1.0, say 0.5. In a preferred aspect of the invention, the vinyl sulfoxide-capped elastomers have blocks with degrees of polymerization greater than 1.0, usually greater than two. These are poly (vinyl sulfoxide)-capped elastomers where the degree of polymerization of the vinyl sulfoxide block is 2 or more, the elastomer molecules have polar end-groups derived from two or more molecules of vinyl sulfoxide.

DISCLOSURE OF THE INVENTION

It is therefore, an object of the present invention to provide (vinyl sulfoxide)-and poly (vinyl sulfoxide)-capped elastomers.

It is a further object of the present invention to provide compounded, vulcanizable elastomer compositions made from such (vinyl sulfoxide)-and poly (vinyl sulfoxide)-capped elastomers.

It is another object of the present invention to provide vulcanized elastomeric compositions having reduced hysteresis characteristics.

It is still a further object of the present invention to provide elastomeric compounds for use in manufacturing articles and components for articles which exhibit low hysteresis properties.

Still another object of the present invention is to provide improved tires having decreased rolling resistance and low heat build-up characteristics.

These and other objects together with the advantages thereof over the existing art, which shall become apparent from the specification which follows, are accomplished by the invention as hereinafter described and claimed.

SUMMARY OF THE INVENTION

The present invention provides (vinyl sulfoxide)-and poly (vinyl sulfoxide)-capped elastomers made by capping lithium-terminated elastomer intermediates with one or more vinyl sulfoxides of the formula $$CH_2=CR'S(O)R$$

wherein R' is hydrogen, a lower alkyl group of one to about eight carbons or an aryl group of six to about ten carbons and R is hydrocarbyl group of one to about twelve carbons. Typically, the lithium-terminated intermediate is a diene polymer made by polymerizing a conjugated diene monomer of four to about eight carbons with a lithium initiator; often it is made by copolymerizing the diene monomer with a vinyl arene monomer of eight to about twelve carbons to produce a diene-vinyl arene copolymer of the general formula poly (butadiene-co-vinyl arene). Such copolymers are usually random in structure. Specific diene monomers include butadiene and its homologs and specific vinyl arenes include styrene and its homologs.

Also within the scope of the invention are compounded, vulcanizable elastomer compositions comprising (a) the (vinyl sulfoxide)-and poly (vinyl sulfoxide)-capped elastomer described above, (b) a finely divided reinforcing agent such as carbon black and (c) a vulcanizing system such as a sulfur-based vulcanizing system.

A further aspect of the invention provides a vulcanized elastomer compound of low hysteresis properties made by vulcanizing the above described elastomer compositions. The invention also includes components for fabricated rubber articles such as pneumatic tires made from these vulcanized compounds and specifically road-contacting tread components for use in the construction of such tires. Tires of low rolling resistance comprising these road-contacting tread components are also within the scope of the invention.

The invention also comprises processes for making (vinyl sulfoxide)-and poly (vinyl sulfoxide)-capped elastomers which comprise the steps of:

(I) polymerizing under anionic conditions with a lithium-containing initiator at least one conjugated diene monomer and, optionally at least one vinyl arene monomer, to form a lithium-terminated elastomer intermediate of lithium-terminated elastomer intermediate;

(II) capping the lithium terminated elastomer intermediate under anionic reaction conditions by reaction a vinyl sulfoxide of the formula $CH_2=C(R')$ $S(O)R$ wherein R' is hydrogen, lower alkyl of one to eight carbons or an aryl group of six to about ten carbons and R is a hydrocarbyl group of one to about twelve carbons, the amount of vinyl sulfoxide being greater than 0.5 molar equivalent based on lithium in the lithium-terminated elastomer intermediate, to form a lithium-terminated poly (vinyl sulfoxide)-or (vinyl sulfoxide)-capped elastomer intermediate;

(III) hydrolyzing the lithium-terminated (vinyl sulfoxide) elastomer intermediate, to form a poly (vinyl sulfoxide)-or (vinyl sulfoxide)-capped elastomer; and (IV) recovering the poly (vinyl sulfoxide) or (vinyl sulfoxide)-capped elastomer.

Other aspects of the invention will be apparent to these of skill in the art upon study of this specification.

DETAILED DESCRIPTION OF THE INVENTION

The (vinyl sulfoxide)-capped elastomers of the present invention are made by reaction of a lithium-terminated elastomer intermediate with greater than 0.5 molar equivalent (based on the lithium) of a vinyl sulfoxide of the formula $CH_2=C(R')$ $S(O)R$ wherein R' is a hydrogen atom, a low alkyl group of one to about eight carbons, such as a methyl, ethyl, propyl, butyl and, so forth to octyl group. Preferably, R' is a hydrogen atom or a methyl group. In the above vinyl sulfoxide formula, R is a hydrocarbyl group (that is, a group consisting of hydrogen and carbon atoms) of one to about 12 carbons such as an alkyl or alkenyl group, for example, methyl, ethyl, butyl, decyl, dodecyl, or an aryl, alkaryl or aralkyl group such as, phenyl, tolyl, xylyl, and naphthyl groups, benzyl, 2-phenyl ethyl, 2-(betanaphthyl) ethyl and like groups. Preferably, R is an ethyl, propyl, phenyl or benzyl group. A particularly useful vinyl sulfoxide is vinyl phenyl sulfoxide. Cyclic vinyl sulfoxides such as 1,2-dihydro thiophene S-oxide and homologous mono unsaturated cyclic sulfoxides can also be used as can mixtures of two or more of the above-described vinyl sulfoxides.

An important feature of the present invention is the use of a vinyl sulfoxide capping reagent. Such reagents have a vinyl group $CH_2=C(R)-$ in a position adjacent to the sulfoxide moiety and inherently different than alkyl or aryl sulfoxides in their reactivity under the anionic conditions used in this invention where reaction occurs primarily through the vinyl group adjacent to the sulfoxide moiety. In one aspect of the invention, more than about 1.0 molar equivalent of vinyl sulfoxide (based on the lithium in the lithium-terminated elastomer intermediate) is used to provide poly (vinyl sulfoxide) blocks derived from more than one sulfoxide molecule. Typically an amount corresponding to 1.1, 1.2, 1.5, 2.0, 3.5 up to 10.0 molar equivalents of vinyl sulfoxide per gram atom of polymer lithium is used. Generally, about 1.0 to about 7.0 molar equivalent of vinyl sulfoxide are used per equivalent of lithium. Thus, the use of a molar excess of vinyl sulfoxide provides, in the polymer (vinyl sulfoxide)-capped elastomer, a block of poly (vinyl sulfoxide) having an average degree of polymerization, n, of about 2 or more; preferably n is about 2.0 to 10 while use of about 1 molar equivalent or less of vinyl sulfoxide reactant produces elastomers capped with a single (vinyl sulfoxide)- derived unit or mixtures of capped and uncapped elastomer.

In a typical poly (vinyl sulfoxide) elastomer example, n is approximately 4-6. Such blocks can be represented by the formula

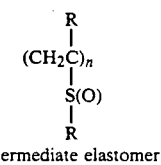

Intermediate elastomer wherein n is about 2 to 10. They are usually terminated by a lithium or hydrogen atom. As will be discussed more fully below, these poly (vinyl sulfoxide) blocks are formed under anionic reaction conditions by a capping reaction of the vinyl sulfoxide with the lithium-terminated elastomer intermediate and then hydroysis to remove the terminal lithium.

Where about 1.0 equivalent (or less) of the vinyl sulfoxide capping agent is used, the lithium-terminated capped-elastomer can be represented by the formula

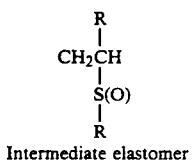

Intermediate elastomer

The lithium-terminated elastomer intermediates of the present invention are prepared by anionic polymerization of diene monomers with a lithium-containing polymerization initiator. Useful diene monomers are conjugated alkadienes of four to about eight carbon atoms such as butadiene, isoprene, pentadiene, 2,3-dimethyl butadiene, etc. Among these, 1,3-butadiene is preferred. Mixtures of such diene monomers can be used.

While the diene monomer can be homo polymerized to provide a poly (butadiene) lithium terminated elastomer intermediate for use in this invention, it is usually preferable that it be copolymerized with a vinyl arene monomer of eight to about twelve carbons such as styrene, vinyl toluene, p-methyl styrene, alphamethyl styrene, vinyl naphthalene and the like. Mixtures of dienes and/or vinyl arenes can also be used to make the lithium terminated elastomer intermediates used in this invention. Preferably styrene is the comonomer of choice and lithium-terminated butadiene-styrene elastomer intermediates are the result.

The above-described diene and optional vinyl arene monomers are polymerized under anionic conditions with a lithium containing polymerization initiator to provide the lithium-terminated elastomer intermediates of this invention. Techniques, parameters, conditions and initiators for such anionic polymerizations are known to these skilled in the art. Such polymerizations provide "living" polymers, that is, polymers with a reactive lithium site on the polymer molecules. Preferred monolithium initiators include alkyl an aryl lithiums such as n-butyl lithium, t-butyl and s-butyl lithium, and phenyl lithium, as well as tri(alkyl) tin lithiums such as tributyl tin lithium. When the latter type of initiator is employed, the resulting elastomer intermediate molecules carry a tri(alkyl) tin group as well as the lithium site.

Polymerization is usually conducted in a conventional solvent for anionic polymerizations such essentially moisture-free hydrocarbons such as hexane, cyclohexane, benzene and the like. Techniques for polymerization, such as semi-batch and continuous polymerization may be employed. If it is desired, to promote randomization in copolymerization and to control vinyl content, a polar coordinator may be included with the polymerization ingredients. The amount of coordinator depends on the amount of vinyl content desired, the level of styrene employed and the temperature of the polymerization, as well as the nature of the specific polar coordinator (modifier) employed.

Compounds useful as polar coordinators include those having an oxygen or nitrogen hetero-atom and a non-bonded pair of electrons. Examples include dialkyl ethers of mono and oligo alkylene glycols; "crown" ethers; tertiary amines such as tetramethylethylene diamine (TMEDA), N-N'-dimethylpiperazine, and tributylamine; tetrahydrofuran (THF), linear and cyclic oligomeric oxolanyl alkanes such as 2-2'-di(tetrahydrofuryl) propane, di-piperidyl ethane, hexamethylphosphoramide, diazabicyclooctane, dimethyl ether, diethyl ether, and the like.

A batch polymerization is begun by charging a blend of monomer(s) and solvent to a suitable reaction vessel, followed by the addition of the polar coordinator (if employed) and the initiator compound previously described. The reactants are heated to a temperature of from about 0° to about 200° and the polymerization is allowed to proceed for from about 0.1 to about 24 hours.

It is usually desired to produce a reactive copolymer intermediate of butadiene and styrene having elastomeric properties for use in the present invention. Such polymers are well-known to the art as styrene/butadiene rubbers, that is, SBR. With such SBRs the lithium-terminated elastomer intermediate used in the present invention can be represented as poly (butadiene-co-styrene)-Li. Such SBRs usually have a diene to styrene content of 90–50:10–50, typically 80–60:20–40 and number average molecular weights, $M_n$, (as determined by gel permeation choromatography) of about 10,000 to 1,000,000 or greater, preferably 50,000 to 750,000, typically about 125,000 to 500,000.

The capping reaction of the lithium-terminated elastomer intermediates with the vinyl sulfoxide takes place under anionic conditions essentially the same as used in the polymerization of the diene. Often the vinyl sulfoxide is simply added to the initial polymerization reaction mixture and reaction continued until the desired amount of sulfoxide is reacted. Usually this reaction is conducted at a temperature between about 0°–90°, typically 15°–30° for about 0.5 to 6.0 hours or more. Often the capping reaction is carried out at ambient temperature 15°–30° for a convenient period of time such as about 1.0–4.0 hours.

The (vinyl sulfoxide)-capped elastomer is recovered by standard techniques such as hydrolyzing any reactive lithium and then isolating the polymer from solvent and reaction by-products by conventional means such as precipitation, steam coagulation, thermal desolventation and the like. The capped elastomer can be further dried by drum, extruder, or vacuum drying or a combination of such procedures.

The preferred (vinyl sulfoxide)-and poly (vinyl sulfoxide)-capped elastomers of this invention can be schematically represented by the formula:

Poly[(diene-co-vinyl arene)-b-(vinyl sulfoxide)$_n$] wherein n is the degree of polymerization of the sulfoxide block, co signifies the random, copolymer nature of the diene/vinyl arene portion of the polymer and b signifies the block nature of the sulfoxide portion. The degree of polymerization of the diene/arene portion of the polymer is not shown because it is so large given the above-noted number average molecular weight of the lithium-terminated elastomer intermediate. Where n equals 1, the diene/vinyl arene elastomer is capped with a single unit derived from the vinyl sulfoxide; where n is greater than 1, the diene/vinyl arene elastomer is capped with a block of sulfoxide-derived units. Where n is less than 1, mixtures of capped and uncapped diene/vinyl arene elastomer are present; for example, when n equals approximately 0.5, a 1:1 mixture of uncapped and capped diene/vinyl arene elastomers is described.

It is believed that the (vinyl sulfoxide)-capped elastomers of the present invention interact significantly during vulcanization with filler present in the compounded elastomer rather than during mixing such as prior art polymers prepared with conventional end-capping agents. It is further believed that (vinyl sulfoxide) block can react with the polymer backbone of other polymers present in the vulcanizable compound during the vulcanization procedure, and thus effectively reduce the number of free end groups. As noted above, since free, unbound polymer end groups cause high hysteresis properties, the present invention provides vulcanizates which exhibiting reduced hysteresis properties.

The (vinyl sulfoxide) capped elastomers of the present invention can be used alone or in combination with other elastomers to prepare vulcanizable compounds to make components for manufactured articles such as tires. For example, they can be blended with any conventionally employed rubber stocks such as natural rubber, synthetic rubber and blends thereof. Such synthetic rubbers are well known to those skilled in the art and include synthetic cis polyisoprene rubber, styrene/butadiene rubber (SBR), polybutadiene, butyl rubber, Neoprene, ethylene/propylene rubber (EPR), ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like. When the poly (vinyl sulfoxide)-capped elastomers of the present invention are blended with conventional rubbers, the amounts can vary widely such as between 10 and 99 percent by weight, depending upon the amount of hysteresis reduction desired.

The inventive (vinyl sulfoxide) and poly (vinyl sulfoxide) elastomers are usually compounded with reinforcing agents such as carbon black and vulcanizing agents to provide vulcanizable, compounded elastomers. Reinforcing agents are used in amounts ranging from about 20 to about 150 parts by weight, per 100 parts of rubber (phr), with about 40 to about 70 phr being preferred. The preferred carbon black reinforcing agents include any of the commonly available, commercially-produced carbon blacks but those having a surface area (EMSA) of at least 20 m2/gram and more, preferably at least 35 m2/gram up to 200 m2/gram or higher, are specifically preferred. The surface area values referred to are those determined by ASTM-D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. See, for example, *The Vanderbilt Rubber Handbook*, pp 408–424, RT Vanderbilt Co., Norwalk, Conn. 06855 (1979). Other carbon blacks which may be utilized include thermal and acetylene blacks. Mixtures of two or more of the above blacks can be used in preparing the compounded elastomers of the invention. Typical values for surface areas of usable carbon blacks are summarized in the following Table I.

TABLE I

| Carbon Blacks | |
|---|---|
| ATMS Designation (D-1765-82a) | Surface Area (m2/g) (D-3765) |
| N-110 | 126 |
| N-220 | 111 |
| N-339 | 95 |
| N-330 | 83 |
| N-550 | 42 |
| N-660 | 35 |

The carbon blacks utilized in the preparation of compounded elastomers of the invention may be in pelletized form or an unpelletized flocculent mass. Preferably, for more uniform mixing, unpelletized carbon black is preferred. The reinforced rubber compounds can be cured in a conventional manner with known vulcanizing agents in the amounts of from about 0.5 to about 4 phr. For example, sulfur or peroxide-based vulcanized (curing) systems may be employed. Typically sulfur-containing vulcanizing systems for a general disclosure of suitable vulcanizing systems one can refer to Kirk-Othmer, *Encyclopedia of Chemical Technology*, 3rd ed., Wiley Interscience, N.Y. 1982, Vol. 20, pp. 365–468, particularly "Vulcanization Agents and Auxiliary Materials" pp. 390–402. Vulcanizing agents may be used alone or in combination. Other reinforcing agents and fillers can also be used such as finely divided silica, clays, talc and the like as can be other conventional rubber compounding ingredients such as anti-degradants, plasticizers, processing oils and aids, stabilizers, and the like.

The compounded, vulcanizable elastomer compositions of the invention can be prepared by compounding or mixing the (vinyl sulfoxide)-capped elastomers thereof with the afore-described carbon black and other conventional rubber additives and vulcanizing systems using standard rubber mixing equipment and procedures and in conventional amounts for such ingredients. Such compounded elastomer compositions, when vulcanized using conventional rubber vulcanization conditions, have reduced hysteresis properties and are particularly adapted for use as tread rubbers for tires having reduced rolling resistance. A typical formulation for the compounded elastomers of the present invention is described in Table II.

TABLE II

| Typical Formulation | |
|---|---|
| | (phr)* |
| Inventive elastomer (rubber) | 100 |
| Carbon Black N339 | 50 |
| Zinc Oxide | 3 |
| Antioxidant | 1 |
| Sulfur | 1.8 |
| Stearic Acid | 2 |
| N-t-butyl-Z-benzothiazyl sulfenamide | 1 |

*parts per hundred rubber

GENERAL EXPERIMENTAL

In order to demonstrate the preparation and properties of the (vinyl sulfoxide) or poly (vinyl sulfoxide)-capped elastomers of the present invention, a lithium-terminated styrene/butadiene rubber (SBR) intermediate is prepared employing a suitable polymerization lithium initiator and an appropriate amount of vinyl sulfoxide, as will be more fully discussed hereinbelow. A control sample of the prepared polymer is isolated, and the remaining polymer is then capped by reaction with a vinyl sulfoxide according to the invention. As noted above, various techniques known in the art for carrying out anionic lithium-initiated polymerization, elastomer intermediates, vinyl sulfoxides and reactant proportions can be employed without departing from the scope of the present invention. In this description, as elsewhere in this application, all temperatures are in degrees centrigrade and parts and percents by weight unless expressly stated otherwise.

Both the control and the invention elastomer samples of each example are then tested, for example, for tensile strength (psi), percent elongation, tan delta (at both 24° and 65°) and the change in tan delta of the invention elastomer as compared to the control elastomer or a similar inventive elastomer is calculated. Tan delta values are determined on a Rheometrics stress rheometer at 0.5 Hz. Each compounded vulcanized elastomer can also be tested for rebound by employing the industry standard ball drop test.

EXAMPLE 1

To a 2-gallon reactor is added 1.53 lbs. of a 33% styrene solution in dry hexane and 8.27 lbs. of a 24.5% butadiene solution in dry hexane. After cooling to 13°, 13.0 millimeters of tri butyl tin lithium initiator and 12.3 moles of dry tetrahydrofuran are added. After 1.5 hours, the reaction temperature is carefully increased to 21.5°. The temperature is then increased at a rate of approximately 5°/0.25 hours until a final reaction temperature of 50° is reached. After 0.25 hours at this temperature, a sample of SBR elastomer intermediate is withdrawn, hydrolyzed and recovered to provide an uncapped Control elastomer. The remaining polymerization mixture is then treated with phenyl vinyl sulfoxide (1 molar equivalent per equivalent gram atom of lithium) and allowed to react at 50° for 0.25 hour. The (vinyl sulfoxide)-capped elastomer is then isolated and drum dried to give inventive capped elastomer Example 1.

EXAMPLE 2

The procedure of Example 1 is followed except an amount of phenyl vinyl sulfoxide corresponding to 6 molar equivalents per equivalent of lithium is used. The product is inventive capped elastomer Example 2.

EXAMPLE 3

The procedure of Example 1 is followed except butyl lithium is used as the initiator. The elastomer produced is inventive capped elastomer Example 3.

EXAMPLE 4

The procedure of Example 1 is followed except butyl lithium is used as the initiator and an amount of phenyl vinyl sulfoxide corresponding to 6 molar equivalents per equivalent of lithium is used. The product is inventive capped elastomer Example 4.

The poly (vinyl sulfoxide)-(vinyl sulfoxide)-capped elastomers of Examples 1 and 3 and 2 and 4, respectively, are analyzed by conventional techniques to determine percent styrene and vinyl content, number average molecular weight (gpc) and hysteresis properties (tan delta). The results of these determinations are shown in Table III. Table IV shows a comparison of the data together with the type of initiator and vinyl sulfoxide reactant ratio.

TABLE III

| | Example: | | | | | | | |
|---|---|---|---|---|---|---|---|---|
| | 1 | | 2 | | 3 | | 4 | |
| | uncapped* | capped | uncapped* | capped | uncapped* | capped | uncapped* | capped |
| Tensile, 24° | | | | | | | | |
| psi | 3150 | 2730 | 2960 | 2910 | 2680 | 2750 | 2560 | 2500 |
| % E | 312 | 277 | 308 | 297 | 317 | 310 | 317 | 280 |
| Rebound | | | | | | | | |
| 24° | 48.8 | 50.4 | 49.6 | 51.8 | 40.0 | 43.8 | 38.4 | 48.4 |
| 65° | 67.4 | 70.0 | 68.8 | 71.8 | 55.6 | 61.0 | 53.0 | 66.4 |
| Shore A | 70 | 70 | 70 | 69.5 | 78.5 | 73 | 77 | 70 |
| tan delta | | | | | | | | |
| 24° | .1323 | .1178 | .1298 | .1052 | .2019 | .1543 | .2195 | .1114 |
| 65° C. | .08123 | .07251 | .08250 | .06651 | .1397 | .1004 | .1480 | .0710 |

*Elastomer Intermediate withdrawn before (vinyl sulfoxide) capping, hydrolyzed and recovered.

TABLE IV

| | Example: | | | |
|---|---|---|---|---|
| | 1 | 2 | 3 | 4 |
| Lithium Initiator | $Bu_3Sn-$ | $Bu_3Sn-$ | Bu— | Bu— |
| % Styrene | 18.9 | 18.2 | 20.8 | 21.3 |
| % Vinyl PBD | 56.7 | 56.7 | 58.9 | 58.4 |
| $M_n \times 10^{-5}$ | 1.20 | 1.19 | 0.96 | 0.93 |
| Equiv Sulfoxide/Lithium | 1 | 6 | 1 | 6 |
| tan delta @ 24°* | .1178 | .1052 | 1543 | .1114 |
| (% reduction from uncapped control) | −11.0 | −19.0 | −23.6 | −49.2 |
| tan delta @ 65°* | .0725 | .0665 | .1004 | .0710 |
| (% reduction from uncapped control) | −10.7 | −19.4 | −28.1 | −52.0 |

*Elastomers compounded with 50 phr N 339 carbon black and vulcanized with sulfur at 150° for 40 minutes.

The tan delta values at both 24° and 65° for each of Examples 1–4 are reduced compared to the uncapped control elastomers (withdrawn before introduction of vinyl sulfoxide reactant), clearly demonstrating the effects of the (vinyl sulfoxide) and poly (vinyl sulfoxide) caps. The data for the poly (vinyl sulfoxide)-capped elastomers of the invention (Examples 2 and 4) show that the reduction in tan delta from the uncapped controls achieved is approximately twice the value obtained with the SBR elastomers capped with only one equivalent of vinyl sulfoxide (Examples 1 and 3). Thus, the (vinyl sulfoxide)-capped SBRs (Examples 1 and 3) show tan delta reductions of approximately 10–25%, while the poly (vinyl sulfoxide)-capped SBRs (Examples 2 and 4) show reductions of 20 to 50 percent.

It is clear from the foregoing examples an specification disclosure, that both the (vinyl sulfoxide)- and poly (vinyl sulfoxide)-capped elastomers present invention are useful for providing vulcanized elastomer compounds with improved, that is reduced, hysteresis characteristics. These elastomers exhibit improved hysteresis properties when compared to similar elastomers prepared by similar means but lacking the (vinyl sulfoxide) capping groups. As a result, the vulcanized compounds containing these elastomers exhibit improved hysteresis properties which provide road-contacting components of improved rolling resistance for tires.

Techniques for preparing tread components for use in pneumatic tires of conventional construction (with grooved road-contacting tread components, sidewalls, spaced beads and metal-or fiber-reinforced carcasses are known in the art. These include extrusion of the road-contacting tread components from rubber stocks including the compounded elastomers of the present invention (or in combination with other types of rubbers as noted above), assembly of the tread components with other elements of tire to provide a green tire and vulcanization of the green tire in a conventional tire mold. Tires made with road-contacting treads comprised of the vulcanized, compounded capped-elastomers according to this invention exhibit desirable properties such as reduced rolling resistance. The compounded (vinyl-sulfoxide)-capped elastomers of this invention can also be used in other tire components such as plycoats for the fabric reinforcement of the tire carcass, in the sidewalls or in the tread rubber base (located under the road-contacting tread portion or tread cap) as well as in other industrial rubber goods such as air springs seismic anti-vibration isolators, engine mounts and the like where the low hysteresis properties they manifest upon vulcanization will provide properties of advantage.

It is to be understood that the invention is not limited to the specific initiators, elastomer intermediates, vinyl sulfoxides, monomers, polar coordinators, reactant ratios, solvents or techniques disclosed herein, except as otherwise stated in the specification. Similarly, the examples have been provided merely to demonstrate practice of the subject invention and do not constitute limitations of the invention. Those skilled in the art may readily select other monomers and process conditions, according to the disclosure made hereinabove that are within the invention.

Thus, it is believed that any of the variables disclosed herein can readily be determined and controlled without departing from the scope of the invention herein disclosed and described. Moreover, the scope of the invention shall include all modifications and variations that fall within the scope of the attached claims.

What is claimed is:

1. A poly (vinyl sulfoxide) - capped elastomer made by capping a lithium terminated elastomer intermediate with more than one equivalent (based on the lithium) of a vinyl sulfoxide of the formula $$CH^2=CR' \ S(O)R$$

wherein R' is hydrogen, a lower alkyl group of one to about eight carbons or an aryl group of six to about ten carbons and R is hydrocarbyl group of one to about twelve carbons and wherein the elastomer intermediate is a diene polymer made by copolymerizing butadiene and styrene with a lithium initiator selected from the group consisting of alkyl lithiums of one to about eight carbons, aryl lithiums of six to about twelve carbons, tri(alkyl) tin lithiums wherein each alkyl is one to about eight carbons and combinations of two or more of these.

2. The elastomer of claim 1 which can be represented by the formula:

$$\text{Poly [(butadiene-co-styrene) - b - (vinyl sulfoxide)}_n\text{]}$$

wherein n, the degree of polymerization of the vinyl sulfoxide block, is greater than 1 to about 10.

3. The elastomer of claim 2 wherein the degree of polymerization n is about 2 to about 6.

4. A vulcanized elastomer compound of low hysteresis properties made vulcanizing the composition of claim 3.

* * * * *